(12) United States Patent
Chung et al.

(10) Patent No.: US 12,363,027 B2
(45) Date of Patent: Jul. 15, 2025

(54) APPARATUS AND METHOD TO PROVIDE ROUTING PATH BETWEEN USER EQUIPMENT AND PRODUCER SERVER ON INFORMATION-CENTRIC NETWORKING SYSTEM

(71) Applicant: Foundation of Soongsil University-Industry Cooperation, Seoul (KR)

(72) Inventors: Yunwon Chung, Seoul (KR); Minwook Kang, Namyangju-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 90 days.

(21) Appl. No.: 18/467,196

(22) Filed: Sep. 14, 2023

(65) Prior Publication Data

US 2024/0388524 A1 Nov. 21, 2024

(30) Foreign Application Priority Data

May 17, 2023 (KR) .................. 10-2023-0063644
Jun. 30, 2023 (KR) .................. 10-2023-0085064

(51) Int. Cl.
*H04L 45/12* (2022.01)
*H04L 45/00* (2022.01)
(Continued)

(52) U.S. Cl.
CPC .......... *H04L 45/123* (2013.01); *H04L 45/02* (2013.01); *H04L 45/24* (2013.01); *H04L 45/32* (2013.01)

(58) Field of Classification Search
CPC ....... H04L 45/02; H04L 45/123; H04L 45/24; H04L 45/32
See application file for complete search history.

(56) References Cited

U.S. PATENT DOCUMENTS 10,178,019 B2 * 1/2019 Carofiglio ............. H04L 45/122
10,567,277 B2 * 2/2020 Rath ....................... H04L 67/63
(Continued)

FOREIGN PATENT DOCUMENTS

KR 10-1210926 B1 12/2012
KR 10-1432554 B1 9/2014
(Continued)

*Primary Examiner* — Thomas J Dailey
(74) *Attorney, Agent, or Firm* — Stein IP, LLC

(57) ABSTRACT

Provided is a method for providing a routing path of a producer server in an information-centric networking system, and the method comprises measuring a routing cost for each of a plurality of routing schemes based on a transition cost between routing schemes, an update packet transfer cost, an interest packet transfer cost, and a data packet transfer cost at each predetermined period $T_k$, estimating a routing cost of period $T_k$ based on an estimated routing cost and a measured routing cost in period $T_{k-1}$ for each of the routing schemes, selecting a routing scheme having a minimum estimated routing cost for each of the routing schemes, and providing a routing path between the producer server and the user equipment by applying the selected routing scheme.

14 Claims, 11 Drawing Sheets

(51) Int. Cl.
    *H04L 45/02*         (2022.01)
    *H04L 45/24*         (2022.01)

(56) References Cited

U.S. PATENT DOCUMENTS

| | | | |
|---|---|---|---|
| 11,483,238 B2* | 10/2022 | Nainar | H04L 69/22 |
| 12,095,724 B2* | 9/2024 | Zhang | H04L 61/457 |
| 2020/0305042 A1* | 9/2020 | Alam | H04L 45/121 |
| 2021/0289418 A1* | 9/2021 | McIlroy | H04W 56/0075 |
| 2024/0196306 A1* | 6/2024 | Milheiro Mendes | H04L 45/126 |

FOREIGN PATENT DOCUMENTS

| | | | |
|---|---|---|---|
| KR | 10-1611319 B1 | 4/2016 | |
| KR | 10-2218325 B1 | 2/2021 | |

* cited by examiner

FIG. 3

| / | <routing name> | / | <Content name> | / | <update name> |

APPARATUS AND METHOD TO PROVIDE ROUTING PATH BETWEEN USER EQUIPMENT AND PRODUCER SERVER ON INFORMATION-CENTRIC NETWORKING SYSTEM

CROSS-REFERENCE TO RELATED APPLICATIONS

This application claims the benefit of Korean Application No. 10-2023-0063644, filed May 17, 2023, and Korean Application No. 10-2023-0085064, filed Jun. 30, 2023, in the Korean Intellectual Property Office. All disclosures of the documents named above are incorporated herein by reference.

TECHNICAL FIELD

The present invention relates to an apparatus and method for providing a routing path between a user equipment and a producer server in an information-centric networking (ICN) system.

BACKGROUND ART

ICN is a networking paradigm that focuses on information retrieval and distribution instead of the existing host-centric communication model. In ICN, the network architecture is designed in a way that prioritizes data objects or content over specific endpoints or devices. In such ICN, the forwarding information base (FIB) of a router in the network is updated using an update packet to provide a routing path between a user and a producer.

The flooding-based routing scheme is a routing scheme that uses a method of updating the FIB by registering the content name to all routers in the network. Since it provides the shortest path between the user and the producer, there is an advantage that the content provision cost is very low. However, if the producer moves frequently, there is a disadvantage in that the routing path update cost is very high since the FIB is updated by registering the content name to all routers in the network every time.

The anchor-based routing scheme is a routing scheme that uses a method of registering the content of the producer centering on the router set as the anchor router. Since only the FIB of the router located in the path between the producer and the anchor router is updated, there is an advantage that the routing path update cost is lower than that of the flooding-based routing scheme. However, since content should always pass through an anchor router to provide content when content requests from users frequently occur, there is a disadvantage that the content provision cost is higher than that of the flooding-based routing scheme.

The pointer forwarding-based routing scheme uses a method of registering content by setting a routing path with a previously connected router whenever a producer moves to a new router, starting with a home router initially connected and set by a producer. Since the FIB is updated between a producer, a previously connected router and a currently connected router, there is an advantage that the routing path update cost is very low compared to the aforementioned flooding-based routing scheme and anchor-based routing scheme.

However, when producers frequently move, there is a disadvantage in that routing paths between users and producers increase.

RELATED ART

Korean Patent Publication No. 10-2012-0088299

DISCLOSURE

Technical Problem

The present invention is proposed to solve the above problems, and an object of the present invention is to provide an apparatus and method for providing a routing path between a user equipment and a producer server by adaptively selecting an appropriate routing scheme according to a changing network environment.

Technical Solution

In order to achieve the above object, according to an embodiment of the present invention, a method for providing a routing path of a producer server in an information-centric networking system comprises measuring a routing cost for each of a plurality of routing schemes based on a transition cost between routing schemes, an update packet transfer cost, an interest packet transfer cost, and a data packet transfer cost at each predetermined period $T_k$, estimating a routing cost of period $T_k$ based on an estimated routing cost and a measured routing cost in period $T_{k-1}$ for each of the routing schemes, selecting a routing scheme having a minimum estimated routing cost for each of the routing schemes, and providing a routing path between the producer server and the user equipment by applying the selected routing scheme.

In order to achieve the above object, according to an embodiment of the present invention, a producer server for providing a routing path in an information-centric networking system comprises a measurement unit for measuring a routing cost for each of a plurality of routing schemes based on a transition cost between routing schemes, an update packet transfer cost, an interest packet transfer cost, and a data packet transfer cost at each predetermined period $T_k$, an estimation unit for estimating a routing cost of period $T_k$ based on an estimated routing cost and a measured routing cost in period $T_{k-1}$ for each of the routing schemes, and a selection unit for selecting a routing scheme having a minimum estimated routing cost for each of the routing schemes, wherein the producer server provides a routing path between the producer server and the user equipment by applying the selected routing scheme.

Advantageous Effects

According to one aspect of the present invention described above, there is an effect of reducing communication costs by the producer server adaptively selecting and applying a routing scheme that minimizes routing path update costs in a changing network environment and an advantage of applying to an actual ICN environment.

DESCRIPTION OF DRAWINGS

These and/or other aspects will become apparent and more readily appreciated from the following description of the embodiments, taken in conjunction with the accompanying drawings which:

FIG. 3 is a diagram showing an update packet name structure for updating a routing path according to an embodiment of the present invention;

DETAILED DESCRIPTION OF EMBODIMENTS

Figure 1:
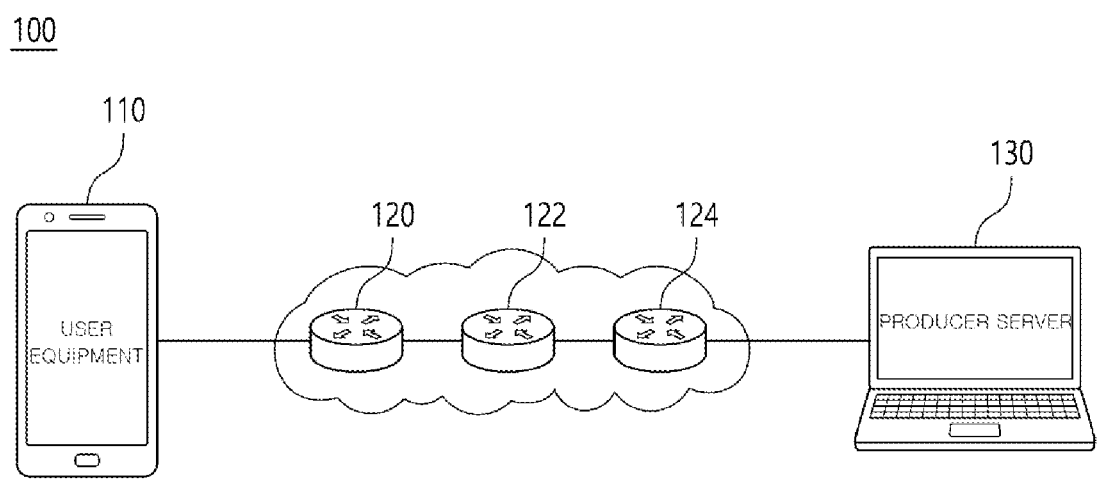
FIG. 1 is a system diagram showing an example of an ICN system according to an embodiment of the present invention.

The detailed description of the present invention which follows refers to the accompanying drawings which illustrate, by way of illustration, specific embodiments in which the present invention may be practiced. These embodiments are described in sufficient detail to enable those skilled in the art to practice the present invention. It should be understood that the various embodiments of the present invention are different from each other but are not necessarily mutually exclusive. For example, specific shapes, structures, and characteristics described herein may be implemented in another embodiment without departing from the spirit and scope of the invention in connection with one embodiment. Additionally, it should be understood that the location or arrangement of individual components within each disclosed embodiment may be changed without departing from the spirit and scope of the invention. Accordingly, the detailed description set forth below is not to be taken in a limiting sense, and the scope of the present invention, if properly described, is limited only by the appended claims, along with all equivalents as claimed by those claims. Like reference numbers in the drawings indicate the same or similar function throughout the various aspects.

Components according to the present invention are components defined not by physical division but by functional division, and may be defined by the functions each performs. Each of the components may be implemented as hardware or program codes and processing units that perform respective functions, and the functions of two or more components may be implemented by being included in one component. Therefore, the names given to the components in the following embodiments are not to physically distinguish each component, but to imply the representative function performed by each component, and it should be noted that the technical idea of the present invention is not limited by the names of the components.

Before describing an embodiment of the present invention, a dynamic routing scheme proposed in the present invention will be briefly described. The dynamic routing scheme means that the producer transitions to a state in which it operates with the routing scheme selected according to the network environment. It means that considering the routing cost calculated based on the information collected by the producer, the routing cost of each routing scheme in the next period, that is, the flooding-based routing scheme, the anchor-based routing scheme, and the pointer-forward-based routing scheme, is estimated, and the routing scheme having the minimum estimated cost is applied.

Hereinafter, preferred embodiments of the present invention will be described in more detail with reference to the drawings.

FIG. 1 is a system diagram showing an example of an ICN system according to an embodiment of the present invention.

Referring to FIG. 1, the illustrated ICN system 100 comprises a user equipment (UE) 110, first to third ICN routers 120, 122, and 124 and a producer server 130. In FIG. 1, a configuration, in which the user equipment 110 is connected to the producer server 130 through three ICN routers, is described as an example, but the number of ICN routers included in the ICN system 100 may increase or decrease depending on network conditions.

When moving to a new ICN router, the producer server 130 generates an update packet and transmits the generated update packet to the new ICN router. In FIG. 1, it is assumed that the new ICN router is the third ICN router 124, and thus the producer server 130 transmits the update packet to the third ICN router 124.

The user equipment 110 requests content by transmitting an interest packet, and the interest packet is transferred to the producer server 130 through the first to third ICN routers 120, 122, and 124. Upon receiving the interest packet transmitted from the user equipment 110, the producer server 130 generates a data packet including content corresponding to the interest packet, and transmits the generated data packet to the user equipment 110 through the first to third ICN routers 120, 122, and 124. In an embodiment of the present invention to be described later, for convenience of description, an 'ICN router' will be referred to as a 'router.'

Figure 2:
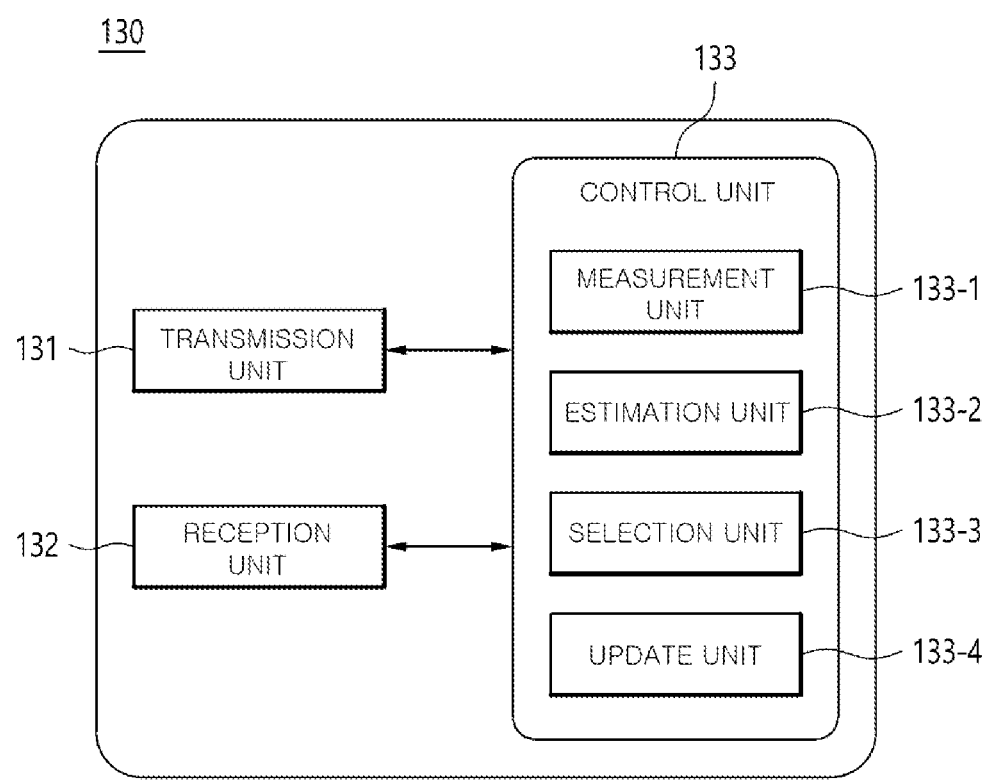
FIG. 2 is a device diagram showing the internal blocks of a producer server applying a dynamic routing scheme according to an embodiment of the present invention.

FIG. 2 is a device diagram showing the internal blocks of a producer server applying a dynamic routing scheme according to an embodiment of the present invention.

Referring to FIG. 2, the illustrated producer server 130 comprises a transmission unit 131, a reception unit 132, and a control unit 133, and the control unit 133 comprises a measurement unit 133-1, an estimation unit 133-2, a selection unit 133-3 and an update unit 133-4.

The control unit 133 provides a routing path between the producer server 130 and the user equipment 110 by controlling the overall operation of the producer server 130. In particular, the measurement unit 133-1 measures transition costs between routing schemes, update packet transfer costs, interest packet transfer costs, data packet transfer costs, routing costs, etc., and the estimation unit 133-2 estimates the routing cost of the next period based on the measured routing costs.

The selection unit 133-3 selects a routing scheme that minimizes the estimated routing cost for each of the routing schemes, that is, the flooding-based routing scheme, the anchor-based routing scheme, and the pointer forwarding-based routing scheme, and the update unit 133-4 updates an anchor router and a home router constituting the ICN system to a new access router when a transition between routing schemes occurs.

The transmission unit 131 transmits various messages under the control of the control unit 133. In particular, the transmission unit 131 transmits an update packet for updating a routing path and a data packet for providing content.

The reception unit 132 receives various messages under the control of the control unit 133. In particular, the reception unit 132 receives an interest packet transmitted from the user equipment 110.

Hereinafter, an update packet transmitted from the transmission unit 131 will be described in more detail through FIG. 3.

Figure 3:
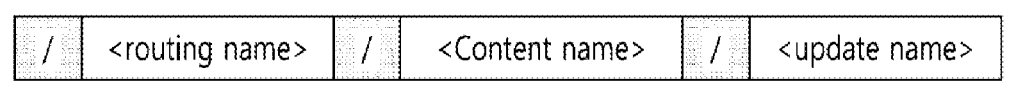

FIG. 3 is a diagram showing the name structure of an update packet for updating a routing path according to an embodiment of the present invention.

Referring to FIG. 3, the illustrated update packet is composed of <routing name>, <content name>, and <update name>.

<routing name> is used to determine the outgoing face of the update packet by referring to the U-FIB (Update Forwarding Information Base) of the router, and is defined as follows according to the transfer purpose.

Assuming that the producer server selects the flooding-based routing scheme, the producer server sets the <routing name> of the update packet to "/router" to update the FIB of all routers in the network.

Assuming that the producer server selects the anchor-based routing scheme, the producer server sets <routing name> to "/producer_name," the name of the producer server, to update the FIBs of currently connected routers, anchor routers, and routers previously connected to the anchor router.

Assuming that the producer server selects the pointer forwarding-based routing scheme, the producer server sets <routing name> to "/router_p," the name of the previously connected router, to update the FIB between the currently connected router and the previously connected router.

<content name> has the same name structure as the ICN content name, and may comprise the name of the producer server, the name of the content application provided by the producer server, and the actual content name. For example, <content name> where the name of the producer server is "producer" and the name of the content application is "application" is displayed as "/producer/application."

<update name> is a name structure used to guarantee the shortest path between routers in the flooding-based routing scheme. The router searches the U-FIB for a face corresponding to <update name> and updates the FIB and U-FIB with the corresponding face. For example, a router receiving an update packet whose <update name> is "router_x" searches the U-FIB for a face corresponding to "router_x" and records it in the FIB and U-FIB.

The update packet described with reference to FIG. 3 is processed by a router, and the structure and components of the router will be described in detail in FIG. 4 to be described later.

Figure 4:
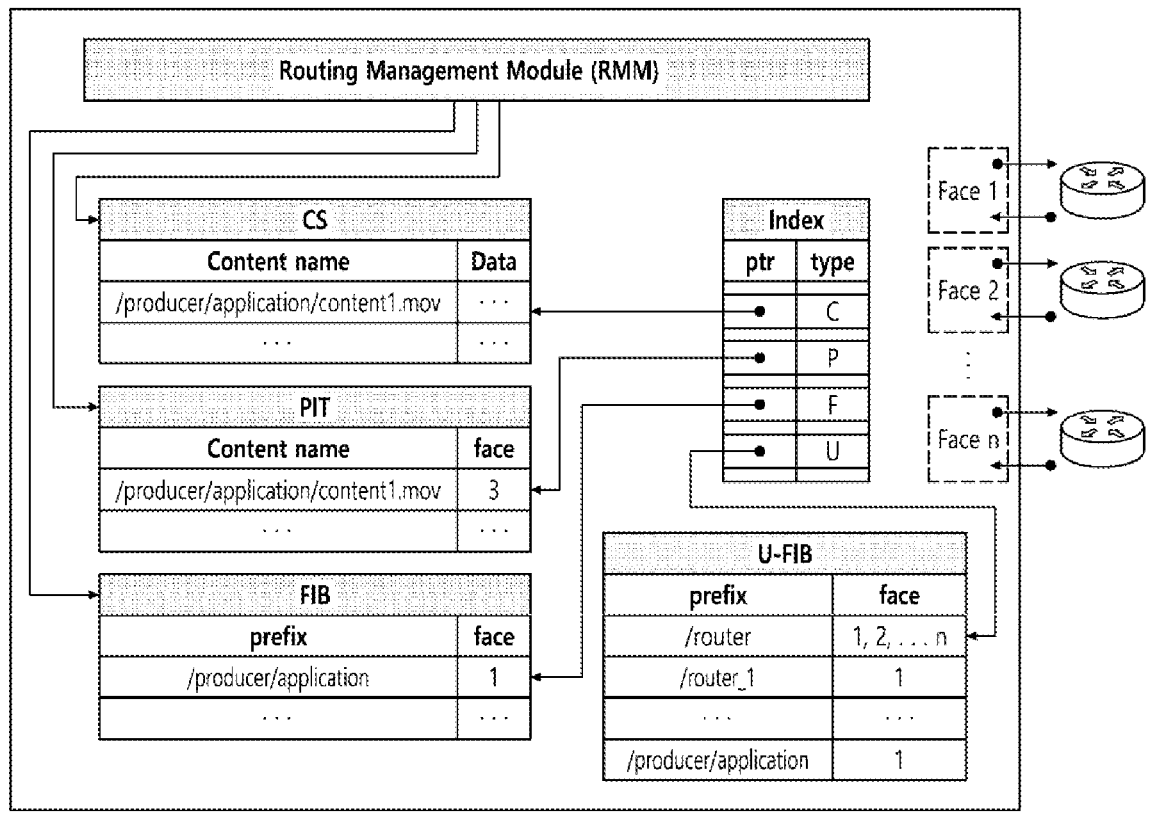
FIG. 4 is a diagram showing a router structure and components according to an embodiment of the present invention.

FIG. 4 is a diagram showing the structure and components of a router according to an embodiment of the present invention.

Referring to FIG. 4, a router receives an update packet transmitted from a producer server and processes the received update packet using a routing management module (RMM) and a U-FIB. Here, the router may correspond to any one of the first to third ICN routers 120, 122, and 124 of FIG. 1, and may be connected to other routers through n faces as shown.

The RMM is defined as a module with control functions to manage the components of a router, and comprises an update packet inspection function, a name structure extraction function, and a routing table update function. When a router receives an update packet, the RMM checks the nonce field of the update packet through the update packet inspection function to prevent looping, and uses the name structure extraction function to separate the <routing name>, <content name> and <update name> in the name field of the update packet, and updates the FIB and U-FIB through the routing table update function.

The U-FIB is a routing table, in which face information corresponding to the shortest path to all routers in the ICN network is recorded, and is managed by the RMM. When a router receives an update packet, information on the router currently connected to the producer server is recorded through <update name>, which constitutes the update packet.

The content store (CS), PIT (Pending Interest Table), and FIB are basic components of a router, and the CS is a cache memory built into the router that stores and retrieves data based on content names.

The PIT is a data structure for storing interest packets for content that has not yet been received and is used to manage data transmission and transfer data to a user equipment or other router that has requested content.

The FIB is a database that stores and manages routing information, and is used to transfer content to the next hop based on the content name.

An index is a data structure that maps a content name to a location or address where the content is stored.

Face 1 to face n represent data transmission/reception paths or communication interfaces.

Hereinafter, an update packet processing procedure of a router according to an embodiment of the present invention will be described through Table 1 below.

TABLE 1

Algorithm of Update packet handling procedure in ICN router

Initialization: ICN router n, Update packet e
Namespace /<routing name>/<Content name>/<update name>
1:   if ICN router n receives Update packet e then
2:      Extract namespace of Name field in Update packet e:
        <routing name>, <Content name>, <update name>
3:      if <routing name> = "/router" then
4:         Retrieve the face $f_{update\ name}$ according to the <update name> in U-FIB
5:         Update FIB: (prefix, face) ← (<Content name>, $f_{update\ name}$)
6:      else then
7:         Update FIB: (prefix, face) ← (<Content name>, $f_{incoming}$)
8:      end if
9:      Retrieve the face $f_{update\ name}$ according to the <routing name> excluded incoming face $f_{incoming}$ in U-FIB
10:     $f_{outgoing}$ ← $f_{update\ name}$
11:     if the face $f_{outgoing}$ exists then
12:        Forward the Update packet e to the outgoing face $f_{outgoing}$
13:     else then
14:        Discard the Update packet e
15:     end if
16:     if the Update packet e is processed then
17:        if <routing name> = "/router" then
18:          Update U-FIB: (prefix, face)
            ← (<Content name>, $f_{update\ name}$)
19:        else then
20:          Update FIB: (prefix, face) ← (<Content name> $f_{incoming}$)
21:        end if
22:     end if
23:  end if In Table 1, when an update packet is received, the router extracts the name field of the update packet and separates it into <routing name>, <content name>, and <update name> (lines 1-2).

If <routing name> is "/router," the router searches U-FIB for the face $f_{update\ name}$ corresponding to <update name> and updates the prefix and face of the FIB to <content name> and $f_{update\ name}$, respectively (lines 3-5).

If <routing name> is not "/router," the router updates the prefix and face of the FIB to <content name> and $f_{incoming}$, which is the input face of the update packet, respectively (lines 6-7).

The router searches U-FIB for the $f_{routing\ name}$ corresponding to <routing name>, and sets the remaining $f_{routing\ name}$ except for the input face $f_{incoming}$ to the output face $f_{outgoing}$ (lines 9-10).

In addition, the router transmits an update packet to a corresponding output face when $f_{outgoing}$ exists, and deletes the update packet when $f_{outgoing}$ does not exist (lines 11-15).

After the update packet processing procedure described through lines 1-15 is completed, the router performs U-FIB update. That is, when <routing name> is "/router," the prefix and face of U-FIB are updated to <content name> and $f_{update\ name}$, respectively (lines 17-18).

If <routing name> is not "/router," the router updates the prefix and face of U-FIB to <content name> and $f_{incoming}$, respectively (lines 19-20).

The updated U-FIB information is updated through update packets generated in all routing schemes, but is used only for transmission of update packets generated through the anchor-based routing scheme.

Figure 5:
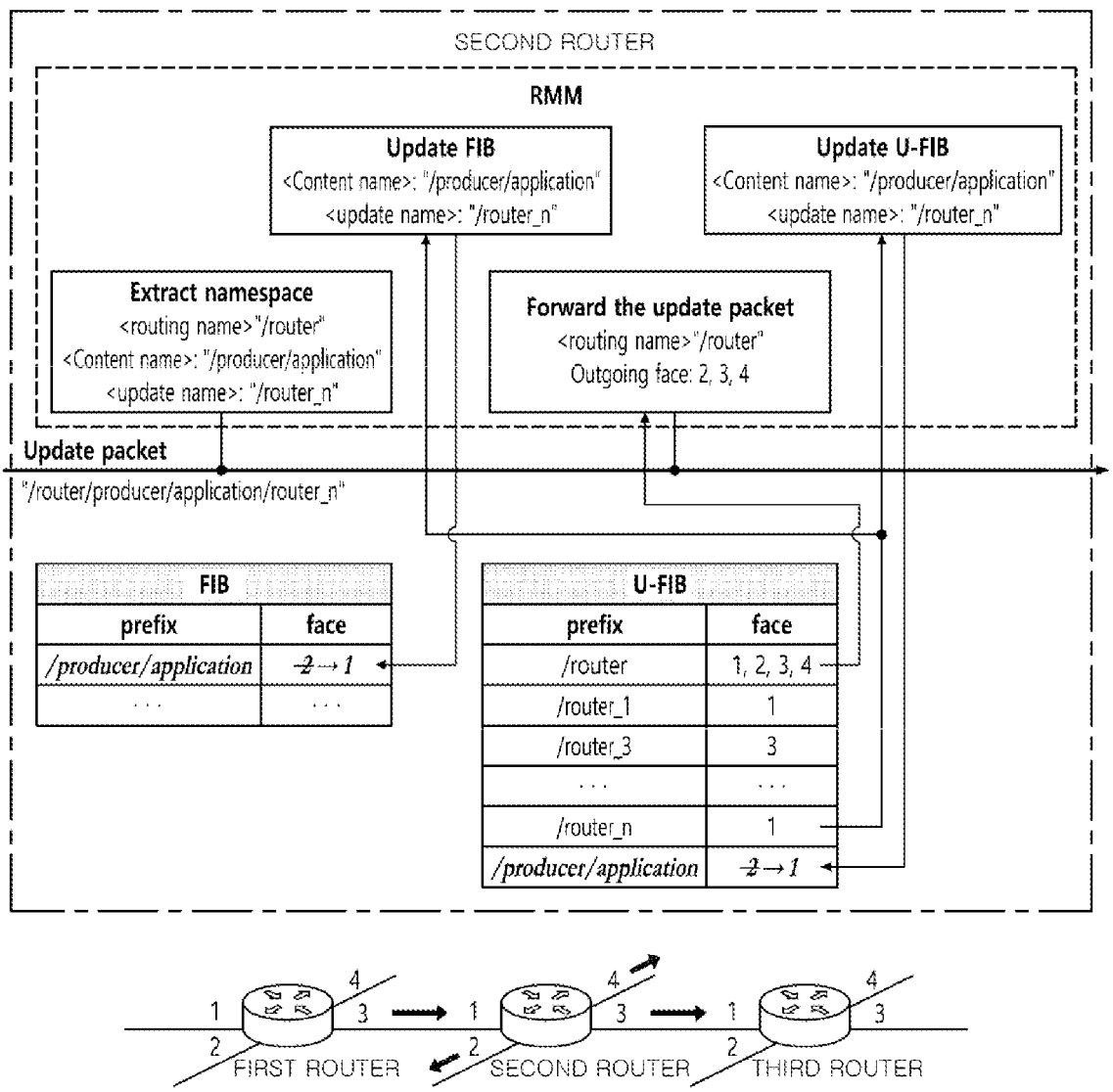
FIG. 5 is a diagram illustrating an update packet processing operation of a router in a flooding-based routing scheme according to an embodiment of the present invention.

FIG. 5 is a diagram illustrating an update packet processing operation of a router in a flooding-based routing scheme according to an embodiment of the present invention.

In FIG. 5, the operation of the router according to the update packet processing procedure described in Table 1 is described as an example, and it is assumed that the router receives an update packet with a name structure of "/router/producer/application/router_n." In addition, in FIG. 5, an update packet processing operation of the second router among the first to third routers shown will be described.

Referring to FIG. 5, the second router receiving the update packet separates the name structure of the update packet into "/router," "/producer/application," and "/router_n" through the name extraction function of the RMM. Here, "/router" corresponds to <routing name>, "/producer/application" corresponds to <content name>, and "/router_n" corresponds to <update name>. Then, the second router searches the U-FIB for "/router_n" and obtains face 1 corresponding to "/router_n."

The second router records 1 in the face corresponding to "/producer/application" of the FIB through the routing table updating function of the RMM. Then, the second router searches U-FIB for "/router" and obtains faces 1, 2, 3, and 4 corresponding to "/router."

The second router transmits the update packet by setting the remaining faces except for the input face 1 of the update packet as the output face of the update packet. After the update packet is transmitted to the output face, the second router updates the face corresponding to "/producer/application" of U-FIB to 1 through the RMM.

U-FIB information update indicating the direction of the producer server is updated through update packets of all routing schemes. However, the updated U-FIB information is used to transfer an update packet generated through an anchor-based routing scheme from a router currently connected to a producer server to a previously connected router via an anchor router.

Figure 6:
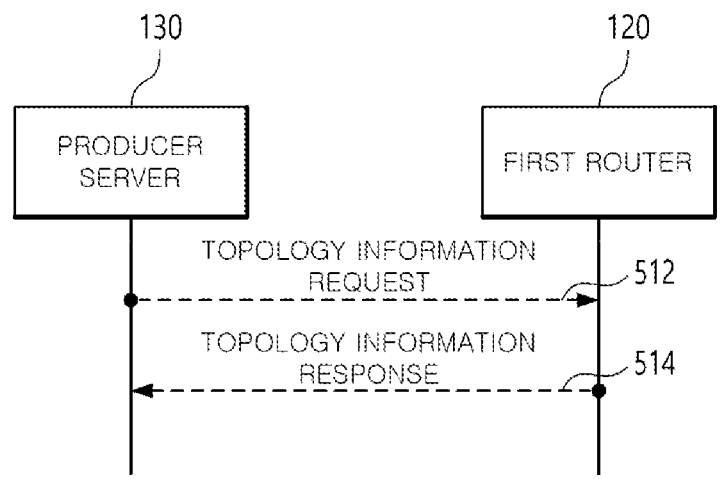
FIG. 6 is a system diagram showing a process of obtaining topology information by a producer server according to an embodiment of the present invention.

FIG. 6 is a system diagram illustrating a process of obtaining topology information by a producer server according to an embodiment of the present invention.

Referring to FIG. 6, the illustrated system comprises a producer server 130 and a first router 120. Here, it is assumed that the first router 120 is a router, to which the producer server 130 is currently connected.

When connecting to a router for the first time, the producer server 130 receives ICN network topology information from the corresponding router, and based on this, determines a routing scheme to be applied by deriving the shortest path between routers. That is, the producer server 130 requests topology information by transmitting a topology information request message to the first router 120 (step 512), and receives topology information through receiving a topology information response message corresponding to the topology information request message (step 514).

Figure 7:
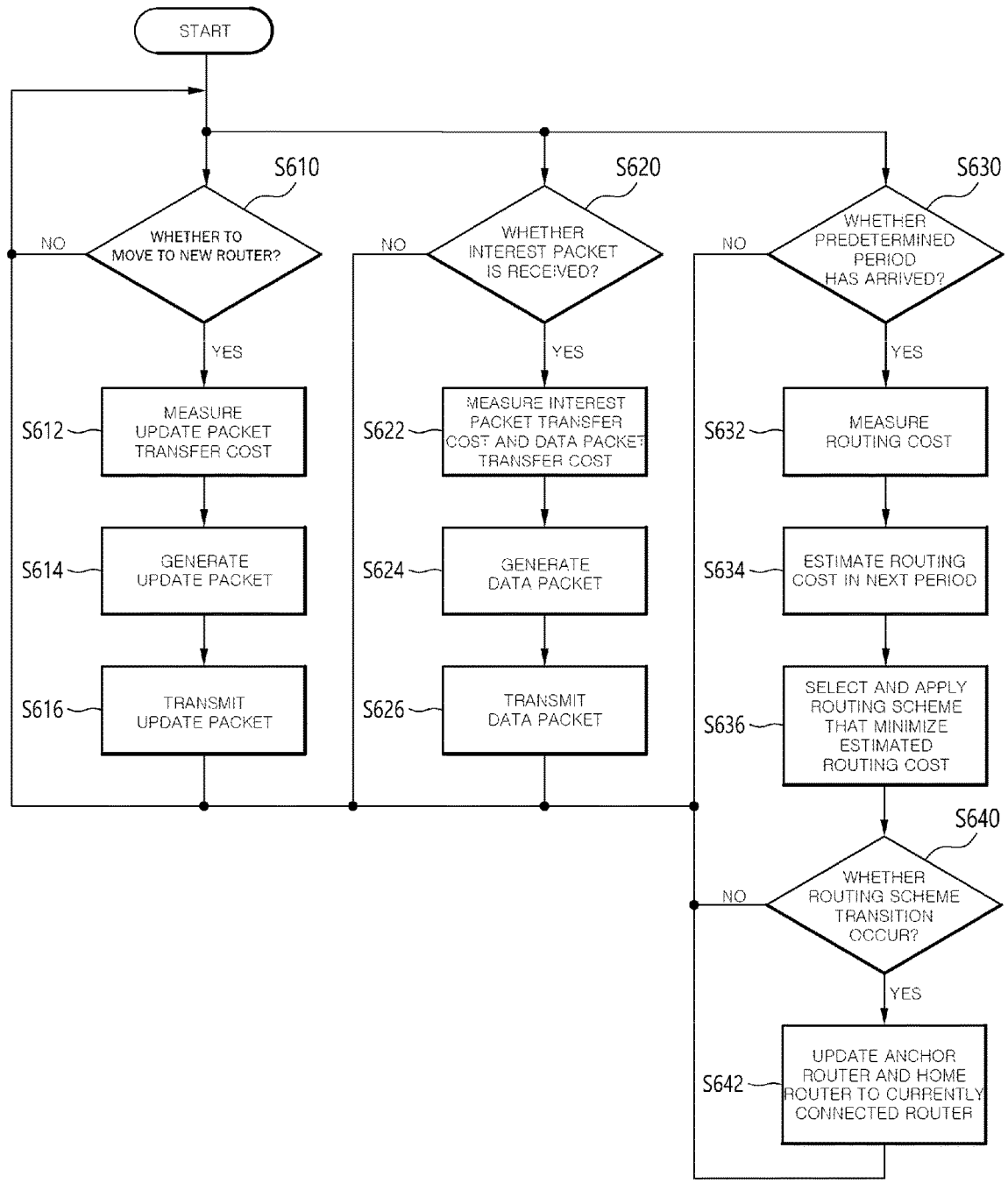
FIG. 7 is a flow chart showing the operation flow of a producer server applying a dynamic routing scheme according to an embodiment of the present invention.

FIG. 7 is a flowchart illustrating an operation flow of a producer server applying a dynamic routing scheme according to an embodiment of the present invention.

Referring to FIG. 7, the producer server checks whether to move to a new router (S610), and if the move to the new router is confirmed, proceeds to S612 to measure update packet transfer costs for each routing scheme. If it does not move to a new router in S610, the producer server proceeds to one of the steps S610, S620, and S630.

In S614, the producer server generates an update packet based on the applied routing scheme and transmits the generated update packet to the currently connected router (S616).

Meanwhile, the producer server checks whether the interest packet is received from the user equipment (S620), and if the reception of the interest packet is confirmed, proceeds to S622 to measure the interest packet transfer cost and data packet transfer cost for each routing scheme. If the interest packet is not received in S620, the producer server proceeds to one of S610, S620 and S630.

In S624, the producer server generates a data packet corresponding to the content requested from the user equipment, and transmits the generated data packet to the currently connected router (S626).

Meanwhile, the producer server checks whether a predetermined period has arrived (S630), and if it is confirmed that the predetermined period has arrived, proceeds to S632 to measure routing costs for each routing scheme. Here, the routing cost is calculated based on a transition cost between routing schemes, an update packet transfer cost, an interest packet transfer cost, and a data packet transfer cost. If the predetermined period does not arrive at S630, the producer server proceeds to one of S610, S620 and S630.

In S634, the producer server estimates the routing cost for each routing scheme in the next period based on the routing cost measured in S632, and selects and applies the routing scheme that minimizes the estimated routing cost (S636).

Then, the producer server checks whether a routing scheme transition occurs (S640), and when it is confirmed that a routing scheme transition occurs, the producer server proceeds to S642 to update the anchor router and the home router to the currently connected router. If the transition of the routing scheme does not occur in S640, the producer server proceeds to one of S610, S620 and S630.

In this way, in the dynamic routing scheme, the producer server estimates the routing cost for each routing scheme in the next period, that is, the flooding-based routing scheme, the anchor-based routing scheme, and the pointer forwarding-based routing scheme, based on the collected network information, and applies the routing scheme having the minimum estimated routing cost.

More specifically, the producer server checks whether the routing scheme is applied according to the activation state defined by Equation 1 below. In Equation 1, $x_{Flooding}$, $x_{Anchor}$ and $x_{Pointer}$ denote activation states of the flooding-based routing scheme, the anchor-based routing scheme, and the pointer forwarding-based routing scheme, respectively. As shown in Equation 2 below, when the routing scheme is activated, the $x_{scheme}$ value is set to 1, and when the routing scheme is deactivated, the $x_{scheme}$ value is set to 0. Since the producer server can apply only one routing scheme, the sum of the activation state values of each scheme always satisfies 1 as shown in Equation 3 below.

$$x = \{x_{Flooding}, x_{Anchor}, x_{Pointer}\} \quad \text{[Equation 1]}$$

$$x_{Scheme} = \begin{cases} 1, & \text{The Scheme is acitive} \\ 0, & \text{otherwise} \end{cases} \quad \text{[Equation 2]}$$

$$x_{Flooding} + x_{Anchor} + x_{Pointer} = 1 \quad \text{[Equation 3]}$$

The producer server calculates the routing cost $C_{Scheme}(T_k)$ incurred during every period $T_k$ as shown in Equation 4 below. The routing cost $C_{Scheme}(T_k)$ is defined as the sum of the transition cost $C^{Transition}(T_k)$ between routing schemes, the update packet transfer cost $C_{Scheme}^{Update}(T_k)$, the interest packet transfer cost $C_{Scheme}^{Interest}(T_k)$, and the data packet transfer cost $C_{Scheme}^{Data}(T_k)$.

$$C_{Scheme}(T_k) = \quad \text{[Equation 4]}$$
$$C^{Transition}(T_k) + C_{Scheme}^{Update}(T_k) + C_{Scheme}^{Interest}(T_k) + \omega C_{Scheme}^{Data}(T_k)$$

In Equation 4, to is defined as a real number greater than 1 as a data packet transfer proportional constant, and k denotes a period index. The producer server estimates the routing cost in the next period as shown in Equation 5 using the routing cost $C_{scheme}(T_k)$ defined in Equation 4.

$$E_{Scheme}(T_k) = \alpha E_{Scheme}(T_{k-1}) + (1-\alpha) C_{Scheme}(T_{k-1}) \quad \text{[Equation 5]}$$

The estimated routing cost $E_{Scheme}(T_k)$ in a period $T_k$ is defined as the weighted sum of the estimated routing cost $E_{Scheme}(T_{k-1})$ and the measured routing cost $C_{Scheme}(T_{k-1})$ in the previous period $T_{k-1}$. In Equation 5, a is a weight having a range of [0,1].

In the dynamic routing scheme, the transition cost $C^{Transition}$ is defined as Equation 6 below. In Equation 6, $C_{wireless}$, $C_{wired}$ and $l_{all}$ denote wireless transmission cost, wired transmission cost, and total number of links in the network, respectively.

$$C^{Transition} = c_{wireless} + c_{wired} l_{all} \quad \text{[Equation 6]}$$

In the dynamic routing scheme, the routing cost of the flooding-based routing scheme is defined by Equations 7 to 9 below.

$$C_{Flooding}^{Update}(T_k) = \sum_{t \in T_t}(c_{wireless} + c_{wired}l_{all}) \quad \text{[Equation 7]}$$

$$C_{Flooding}^{Interest}(T_k) = \sum_{t \in T_t}(2c_{wireless} + c_{wired}l_{n_v^{cur},n_u}) \quad \text{[Equation 8]}$$

$$C_{Flooding}^{Data}(T_k) = \sum_{t \in T_t}(2c_{wireless} + c_{wired}l_{n_v^{cur},n_u}) \quad \text{[Equation 9]}$$

In the flooding-based routing scheme, the update packet transfer cost $C_{Flooding}^{Update}(T_k)$ is defined as the sum of the costs of transferring update packets generated by the producer server to all routers in the network through the routers currently connected to the producer server during the period $T_k$, as shown in Equation 7.

In the flooding-based routing scheme, the interest packet transfer cost $C_{Flooding}^{Interest}(T_k)$ is defined as the sum of the costs of transferring the interest packet from the user equipment to the producer server during the period $T_k$, as shown in Equation 8.

In the flooding-based routing scheme, the data transfer cost $C_{Flooding}^{Data}(T_k)$ is defined as the sum of the costs of transferring data packets from the producer server to the user equipment during the period $T_k$, as shown in Equation 9. In Equations 8 and 9, $1_{n_v^{cur},n_u}$ denotes the number of links between the router $n_v^{cur}$ currently connected to the producer server and the router nu connected to the user equipment.

In the dynamic routing scheme, the routing cost of the anchor-based routing scheme is defined by Equations 10 to 12 below.

$$C_{Anchor}^{Update} = \sum_{t \in T_k}(c_{wireless} + c_{wired}(l_{n_a,n_v^{prev}} + l_{n_a,n_v^{cur}})) \quad \text{[Equation 10]}$$

$$C_{Anchor}^{Interest} = \sum_{t \in T_k}(2c_{wireless} + c_{wired}(l_{n_a,n_u} + l_{n_a,n_v^{cur}})) \quad \text{[Equation 11]}$$

$$C_{Anchor}^{Data} = \sum_{t \in T_k}(2c_{wireless} + c_{wired}(l_{n_a,n_u} + l_{n_a,n_v^{cur}})) \quad \text{[Equation 12]}$$

In the anchor-based routing scheme, the update packet transfer cost $C_{Ancor}^{Update}$ is calculated as the sum of the costs of transferring the update packets generated by the producer server from the router currently connected to the producer server to the previously connected router via the anchor router during the period $T_k$, as shown in Equation 10. In Equation 10, $1_{n_a,n_v^{prev}}$ and $1_{n_a,n_v^{cur}}$ denote the number of links from the anchor router $n_a$ to the previous router $n_v^{rev}$ and the currently connected router $n_v^{cur}$ respectively.

In the anchor-based routing scheme, the interest packet transfer cost $C_{Ancor}^{Interest}$ is defined as the sum of the costs of transferring the interest packet from the user equipment to the producer server through the anchor router during the period $T_k$ as shown in Equation 11.

In the anchor-based routing scheme, the data packet transfer cost $C_{Ancor}^{Data}$ is defined as the sum of the costs of transferring data packets from the producer server to the user equipment via the anchor router during the period $T_k$ as shown in Equation 12. In Equations 11 and 12, $1_{n_a,n_u}$ and $1_{n_a,n_v^{cur}}$ denote the number of links from the anchor router $n_a$ to the router nu connected to the user equipment and the currently connected router $n_v^{cur}$, respectively.

In the dynamic routing scheme, the routing cost of the pointer forwarding-based routing scheme is defined by Equations 13 to Equation 15 below.

$$C_{Pointer}^{Update} = \sum_{t \in T_k} \left( c_{wireless} + c_{wired} l_{n_v^{cur}, n_v^{prev}} \right)$$ [Equation 13]

$$C_{Pointer}^{Interest} = \sum_{t \in T_k} \left( 2c_{wireless} + c_{wired} \left( l_{n_h, n_u} + \sum_{(n_i, n_j) \in A} l_{n_i, n_j} \right) \right)$$ [Equation 14]

$$C_{Pointer}^{Data} = \sum_{t \in T_k} \left( 2c_{wireless} + c_{wired} \left( l_{n_h, n_u} + \sum_{(n_i, n_j) \in A} l_{n_i, n_j} \right) \right)$$ [Equation 15]

In the pointer forwarding-based routing scheme, the update packet transfer cost $C_{Pointer}^{Update}$ is calculated as the sum of the costs of transferring the update packets generated by the producer server from the router currently connected to the producer server to the previously connected router during the period $T_k$, as shown in Equation 13. In Equation 13, $i_{n_v^{cur}, n_v^{prev}}$ denotes the number of links from the currently connected router $n_v^{cur}$ to the previously connected router $n_v^{prev}$.

In the pointer forwarding-based routing scheme, the interest packet transfer cost $C_{Pointer}^{Interest}$ is defined as the sum of the costs of transferring the interest packet from the user equipment to the producer server via the home router during the period $T_k$ as shown in Equation 14.

In the pointer forwarding-based routing scheme, the data packet transfer cost $C_{Pointer}^{Data}$ is defined as the sum of the costs of transferring data packets from the producer server to the user equipment via the home router during the period $T_k$ as shown in Equation 15. In Equations 14 and 15, $l_{nh}$, denotes the number of links from the home router $n_h$ to the router $n_u$ connected to the user equipment, $$\sum_{(n_i, n_j) \in A} l_{n_i, n_j}$$

denotes the number of links between routers to which the producer server is connected from the home router, and $A = \{(n_h, n_{v,1}), (n_{v,1}, n_{v,2}), \ldots, (n_v^{prev}, n_v^{cur})\}$ denotes a set of ordered pairs, in which the previously connected router and the currently connected router are connected in pair.

The producer server, which calculates the estimated routing cost in the period $T_k$ for each of the flooding-based routing scheme, the anchor-based routing scheme, and the pointer forwarding-based routing scheme through Equations 4 to Equation 15 described above, selects the routing scheme that minimizes the estimated routing cost according to Equation 16 below.

$$\min_{Scheme} \left( x \times \begin{pmatrix} E_{Flooding}(T_k) \\ E_{Anchor}(T_k) \\ E_{Pointer}(T_k) \end{pmatrix} \right)$$ [Equation 16]

In Equation 16, it means that $$x = \{x_{Flooding}, x_{Anchor}, x_{Pointer}\}.$$

Hereinafter, the operating procedure of the producer server applying the dynamic routing scheme according to an embodiment of the present invention will be described through Table 2 below.

TABLE 2

| Algorithm of dynamic routing scheme of producer's procedure |
|---|
| Initialization: Producer v, Producer's name "producer", |
| User's attached router $n_u$, Anchor router $n_a$, Anchor router name "router_a", |
| Home router $n_h$, Home router name "router_h", Current attached router $n_v^{cur}$, |
| Current attached router name "router_c", Previous attached router $n_v^{prev}$, |
| Previous attached router name "router_p", New attached router $n_v^{new}$, |
| Period index $k \in K = \{1, 2, \ldots, K\}$, Period $T_k = \{t_1^k, t_2^k, \ldots, t_{max}^k\}$ |
| 1:   for $k \in K$ do |
| 2:     for $t \in T_k$ do |
| 3:       If $t = t_1^k$ then |
| 4:         Calculate routing cost for each routing scheme by equation (4) |
| 5:         Predict routing cost for each routing scheme by equation (5) |
| 6:         Select and Apply routing scheme by equation (16) |
| 7:         if Routing scheme transition has occurred then |
| 8:           Update position: $n_a \leftarrow n_v^{cur}$, $n_h \leftarrow n_v^{cur}$ |
| 9:         end if |
| 10:        Generate Update packet e: "/router/producer/application/router_c" |
| 11:        Forward e to $n_v^{cur}$ |
| 12:       end if |
| 13:       if producer v moves to another ICN router then |
| 14:         Update position: $n_v^{prev} \leftarrow n_v^{cur}$, $n_v^{cur} \leftarrow n_v^{new}$ |
| 15:         Calculate update cost by equation (7), (10) and (13) |
| 16:         if $x_{flooding} = 1$ then |
| 17:           Generate Update packet e: "/router/producer/application/router_c" |
| 18:         else if $x_{anc\_hor} = 1$ then |
| 19:           Generate Update packet e: "/producer/producer/application/router_c" |
| 20:         else if $x_{pointer} = 1$ then |
| 21:           Generate Update packet e: "/router_p/producer/application/router_c" |
| 22:         end if |
| 23:         Forward e to $n_v^{cur}$ |
| 24:       end if |
| 25:       if producer v receives Interest packet i then |
| 26:         Extract User's attached router $n_u$ |
| 27:         Calculate Interest delivery cost by equation (8), (11) and (14) |
| 28:         Calculate Data delivery cost by equation (9), (12) and (15) |

TABLE 2-continued

Algorithm of dynamic routing scheme of producer's procedure

29:   Generate Data packet and Forward to $n_v^{cur}$
30:  end if
31:  end for
32: end for In Table 2, the process of estimating the routing cost and generating the update packet of the producer server applying the dynamic routing scheme is as follows.

The producer server calculates the routing cost for each scheme in every period according to Equation 4 described above, and estimates the routing cost for each scheme expected in the next period according to Equation 5 (lines 4-5). Then, the producer server selects and applies a routing scheme that minimizes the estimated routing cost according to Equation 16 (line 6).

When a routing scheme transition occurs, the producer server updates each anchor router and home router to currently connected routers, generates an update packet with the name structure of "/router/producer/application/router_c," and transmits it to the currently connected router (lines 7-11).

When the producer server moves and is connected to a new router, the previously connected router is updated to the currently connected router, and the currently connected router is updated to the newly connected router (lines 13-14). Then, the producer server calculates the update packet transfer cost for each scheme according to Equations 7, 10, and 13 described above (line 15).

At this time, if the producer server selects the flooding-based routing scheme, that is, if the value $x_{Flooding}$ indicating the activation state of the flooding-based routing scheme is 1, the producer server generates an update packet with the name structure of "/router/producer/application/router_c" (lines 16-17).

Or, if the producer server selects the anchor-based routing scheme, that is, if the value $x_{Anchor}$ indicating the activation state of the anchor-based routing scheme is 1, the producer server generates an update packet with the name structure of "/producer/producer/application/router_c" (lines 18-19).

Alternatively, if the producer server selects the pointer forwarding-based routing scheme, that is, if the value $x_{Pointer}$ indicating the activation state of the pointer forwarding-based routing scheme is 1, the producer server generates an update packet with the name structure of "/router_p/producer/application/router_c" (lines 20-21). Then, the producer server transmits the generated update packet according to the active state of the routing scheme to the currently connected router (line 23).

When the interest packet is received, the producer server extracts the router to which the user equipment is connected, and calculates the interest packet transfer cost for each scheme according to Equations 8, 11, and 14 described above (lines 25-27). Then, the producer server calculates the data packet transfer cost for each scheme according to Equations 9, 12, and 15 described above, and generates a data packet corresponding to the content and transmits the data packet to the currently connected router (lines 28-29).

Figure 8:
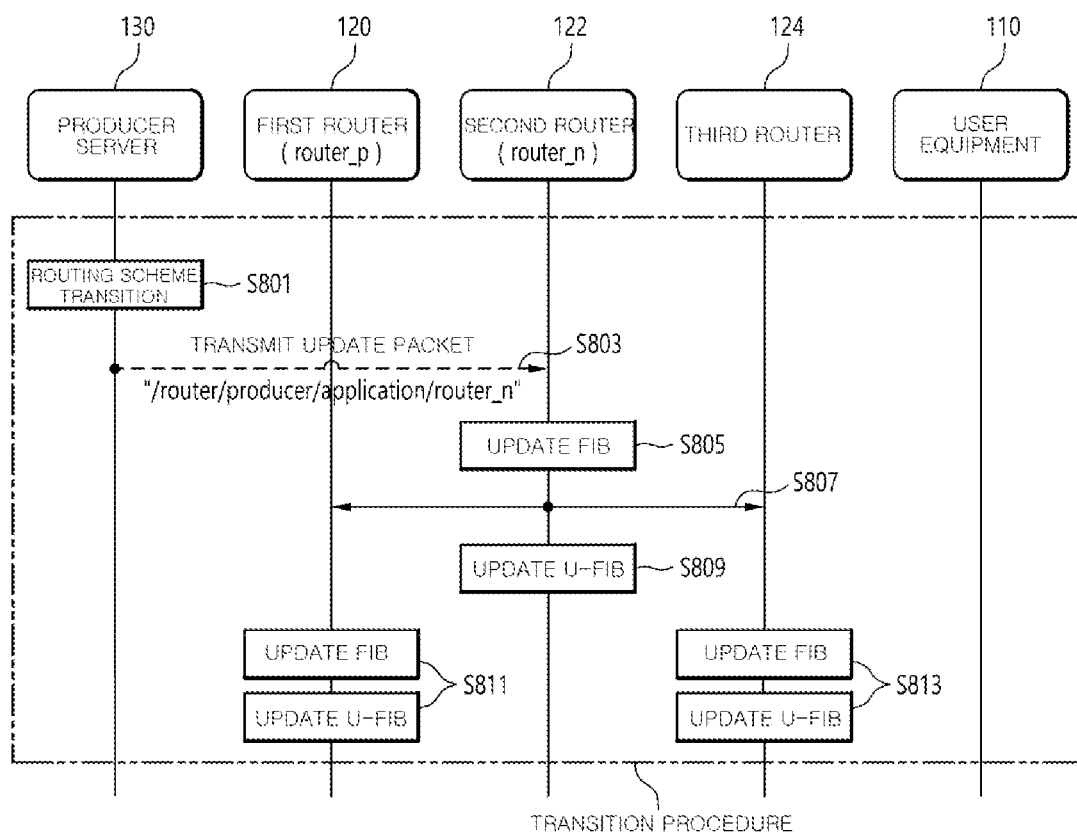
FIG. 8 is a system diagram showing a transition procedure of a dynamic routing scheme according to an embodiment of the present invention.

FIG. 8 is a system diagram illustrating a transition procedure of a dynamic routing scheme according to an embodiment of the present invention.

Referring to FIG. 8, the illustrated ICN system comprises a producer server 130, a first router 120 that is a previous access router of the producer server 130, a second router 122 that is a new access router of the producer server 130, a third router 124 that is another router, and a user equipment 110. Here, the name of the first router 120 may be defined as router_p, and the name of the second router 122 may be defined as router_n, and the name of the corresponding router is written together in the drawing.

When a routing scheme transition occurs (S801), the producer server 130 generates an update packet with the name structure of "/router/producer/application/router_n" and transmits the generated update packet to the second router 122 (S803).

The second router 122 updates the FIB based on the update packet received in S803 (S805) and transfers the update packet to all routers in the ICN system, that is, the first router 120 and the third router 124 (S807). Also, the second router 122 updates U_FIB based on the FIB updated in S805 (S809).

Upon receiving the update packet in S807, the first router 120 and the third router 124 each update the FIB and U_FIB based on the received update packet (S811, S813).

Figure 9:
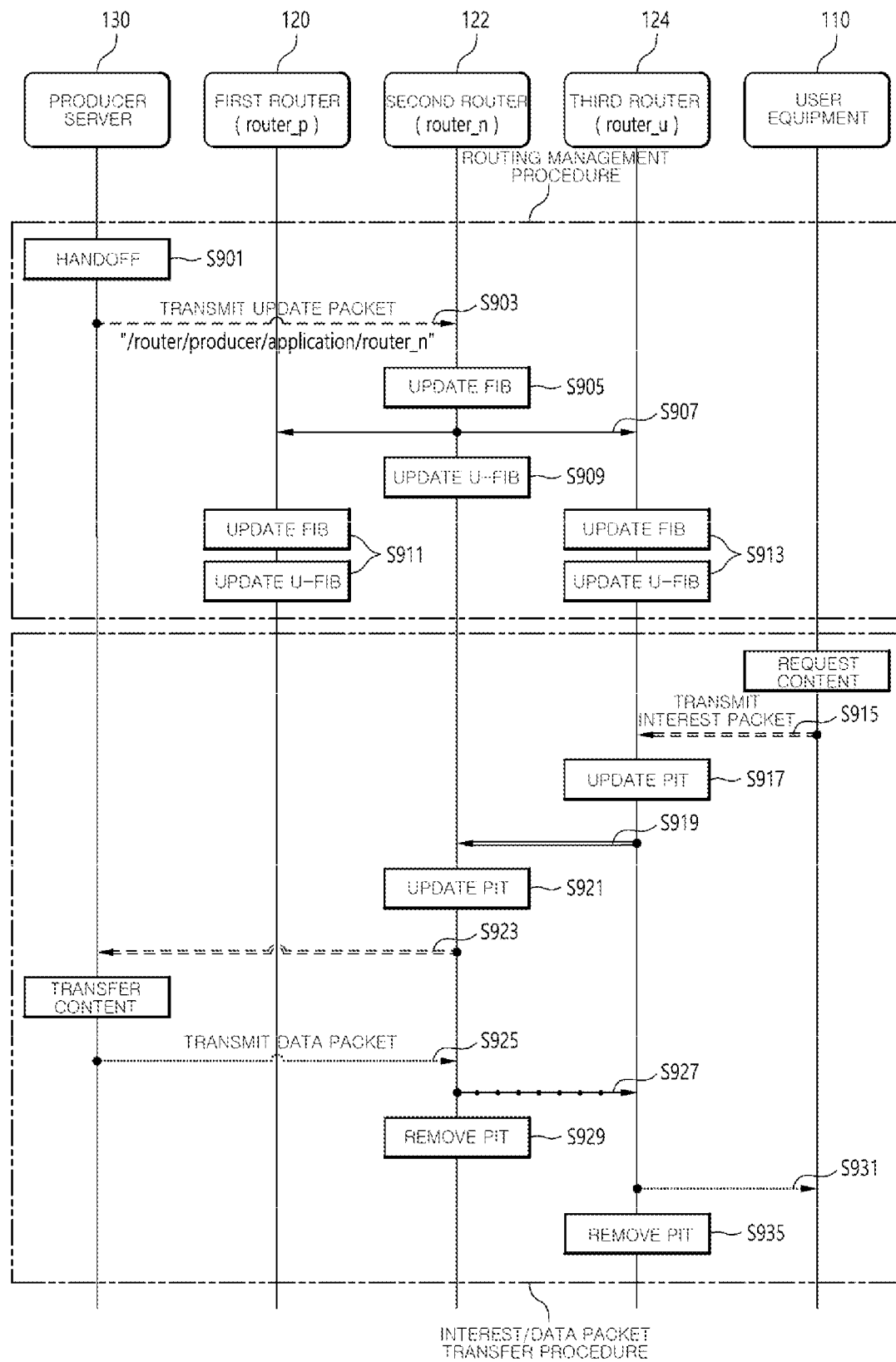
FIG. 9 is a system diagram showing an operating procedure of a flooding-based routing scheme according to an embodiment of the present invention.

FIG. 9 is a system diagram illustrating an operation procedure of a flooding-based routing scheme according to an embodiment of the present invention.

Referring to FIG. 9, the illustrated ICN system comprises a producer server 130, a user equipment 110, a first router 120 that is a previous access router of the producer server 130, a second router 122 that is a new access router of the producer server 130 and a third router 124 that is an access router of the user equipment 110. Here, the name of the first router 120 may be defined as router_p, the name of the second router 122 may be defined as router_n, the name of the third router 124 may be defined as router_u, and the name of the corresponding router is written together in the drawing.

When handoff occurs as it moves from the first router 120 to the second router 122 (S901), the producer server 130 generates an update packet with the name structure of "/router/producer/application/router_n," and transmits the generated update packet to the second router 122 (S903).

The second router 122 updates the FIB based on the update packet received in S903 (S905) and transfers the update packet to all routers in the ICN system, that is, the first router 120 and the third router 124 (S907). Also, the second router 122 updates U_FIB based on the FIB updated in S905 (S909).

The first router 120 and the third router 124 that has received the update packet in S907 each update the FIB and U_FIB based on the received update packet (S911, S913).

The user equipment 110 transmits an interest packet to the third router 124 to request content (S915), and the third router 124 updates the PIT based on the received interest packet (S917), and transfers the interest packet to the second router 122 (S919).

The second router 122 updates the PIT based on the interest packet received in S919 (S921), transfers the interest packet to the producer server 130 to request content (S923).

Upon receiving the interest packet in S923, the producer server 130 transmits a data packet to the second router 122 to transfer content corresponding to the interest packet (S925), and the second router 122 transfers the data packet to the third router 124 (S927) and removes the PIT (S929).

Upon receiving the data packet in S927, the third router 124 transfers the received data packet to the user equipment 110 to provide the content requested by the user equipment (S931), and removes the PIT based on the data packet (S935).

In this way, in the flooding-based routing scheme, the interest packet is transferred through a routing path corresponding to the shortest path between the producer server 130 and the user equipment 110 (user equipment→third router→second router→producer server), and the data packet is transferred through a reverse path of the interest packet transfer path (producer server→second router→third router→user equipment).

Figure 10:
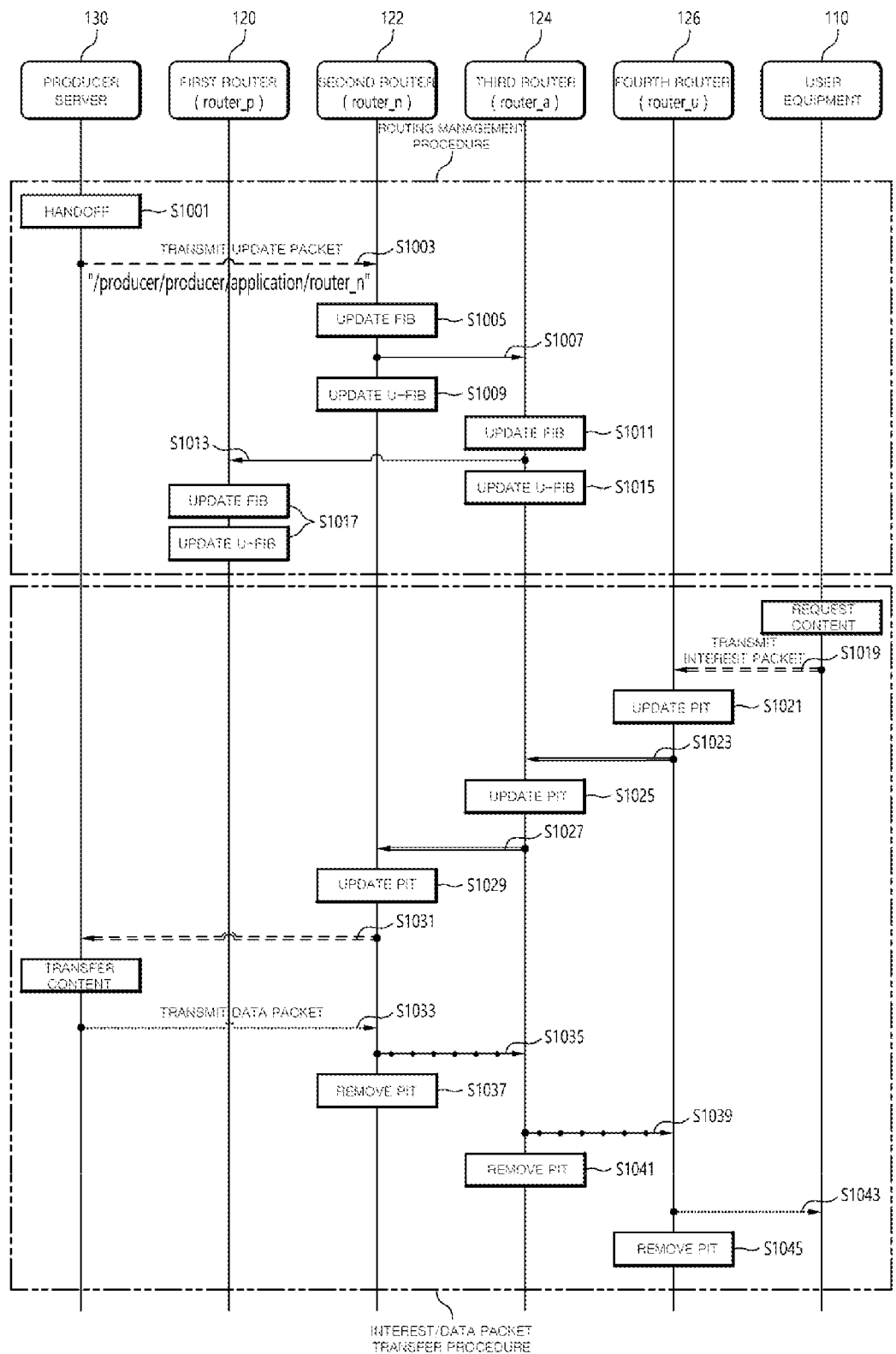
FIG. 10 is a system diagram showing an operating procedure of an anchor-based routing scheme according to an embodiment of the present invention.

FIG. 10 is a system diagram illustrating an operation procedure of an anchor-based routing scheme according to an embodiment of the present invention.

Referring to FIG. 10, the illustrated ICN system comprises a producer server 130, a user equipment 110, a first router 120 that is a previous access router of the producer server 130, a second router 122 that is a new access router of the producer server 130, a third router 124 that is an anchor router, and a fourth router 126 that is an access router of the user equipment 110. Here, the name of the first router 120 is defined as router_p, the name of the second router 122 is defined as router_n, the name of the third router 124 is defined as router_a, and the name of the fourth router 126 is defined as router_u, and the name of the corresponding router is written together on the drawing.

When handoff occurs as it moves from the first router 120 to the second router 122 (S1001), the producer server 130 generates an update packet with the name structure of "/producer/producer/application/router_n" and transmits the generated update packet to the second router 122 (S1003).

The second router 122 updates the FIB based on the update packet received in step S1003 (S1005) and transfers the update packet to the third router 124 (S1007). Also, the second router 122 updates U_FIB based on the FIB updated in S1005 (S1009).

Upon receiving the update packet in step S1007, the third router 124 updates the FIB based on the received update packet (S1011) and transfers the update packet to the first router 120 (S1013). Also, the third router 124 updates U_FIB based on the FIB updated in S1011 (S1015).

Upon receiving the update packet in S1013, the first router 120 updates the FIB and U_FIB based on the received update packet (S1017).

The user equipment 110 transmits an interest packet to the fourth router 126 to request content (S1019), and the fourth router 126 updates the PIT based on the received interest packet (S1021), and transfers the interest packet to the third router 124 (S1023).

The third router 124 updates the PIT based on the interest packet received in S1023 (S1025) and transfers the interest packet to the second router 122 (S1027). The second router 122 updates the PIT based on the interest packet received in S1027 (S1029), and transfers the interest packet to the producer server 130 to request content (S1031).

Upon receiving the interest packet in S1031, the producer server 130 transmits a data packet to the second router 122 to transfer content corresponding to the interest packet (S1033), and the second router 122 transfers the data packet to the third router 124 (S1035) and removes the PIT (S1037).

Upon receiving the data packet in S1035, the third router 124 transfers the data packet to the fourth router 126 (S1039) and removes the PIT based on the data packet (S1041). Upon receiving the data packet in S1039, the fourth router 126 transfers the received data packet to the user equipment 110 to provide the content requested by the user equipment (S1043), and removes the PIT based on the data packet (S1045).

In this way, in the anchor-based routing scheme, the interest packet is transferred from the user equipment 110 to the producer server 130 through the third router 124 that is an anchor router through a routing path corresponding to the shortest path (user equipment→fourth router→third router→second router→producer server), and the data packet is transferred through a reverse path of the interest packet transfer path (producer server→second router→third router→fourth router→user equipment).

Figure 11:
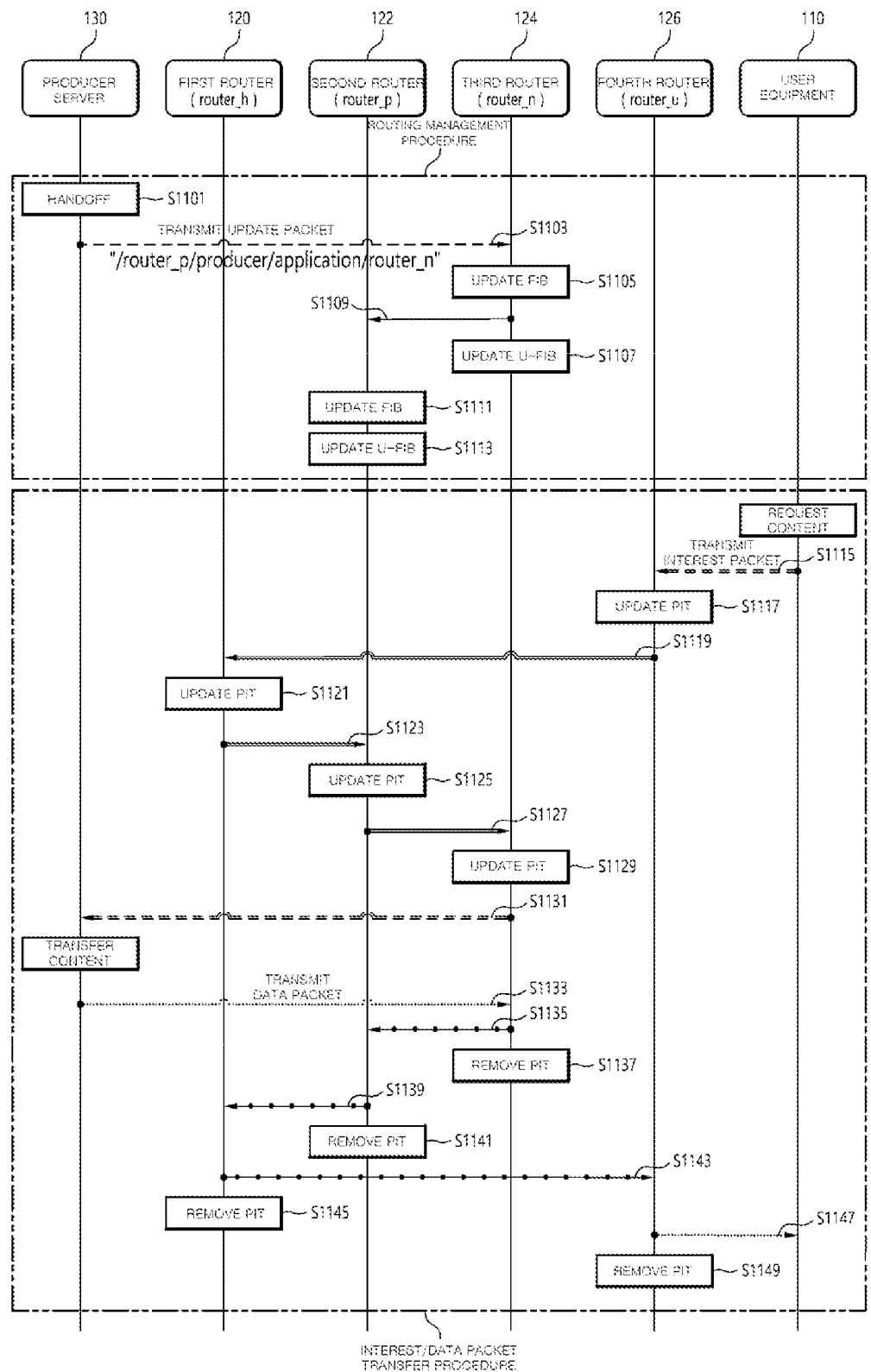
FIG. 11 is a system diagram showing an operating procedure of a pointer flooding-based routing scheme according to an embodiment of the present invention.

FIG. 11 is a system diagram illustrating an operation procedure of a pointer flooding-based routing scheme according to an embodiment of the present invention.

Referring to FIG. 11, the illustrated ICN system comprises a producer server 130, a user equipment 110, a first router 120 that is a home router, a second router 122 that is a previous access router of the producer server 130, a third router 124 that is a new access router of the producer server 130 and a fourth router 126 that is an access router of the user equipment 110. Here, the name of the first router 120 may be defined as router_h, the name of the second router 122 may be defined as router_p, the name of the third router 124 may be defined as router_n, and the name of the fourth router 126 may be defined as router_u, and the name of the corresponding router is written together on the drawing.

When handoff occurs as it moves from the second router 122 to the third router 124 (S1101), the producer server 130 generates an update packet with the name structure of "/router_p/producer/application/router_n," and transmits the generated update packet to the third router 124 (S1103).

The third router 124 updates the FIB based on the update packet received in S1103 (S1105) and transfers the update packet to the second router 122 (S1109). Also, the third router 124 updates U_FIB based on the updated FIB in S1105 (S1107). The second router 122 updates the FIB and U_FIB based on the received update packet. (S1111, S1113).

The user equipment 110 transmits an interest packet to the fourth router 126 to request content (S1115), and the fourth router 126 updates the PIT based on the received interest packet (S1117). That is, the fourth router 126 transfers the interest packet received in S1115 to the first router 120 (S1119), and the first router 120 updates the PIT based on the received interest packet (S1121) and transfers the interest packet to the second router 122 (S1123). The second router 122 updates the PIT based on the interest packet received in S1123 (S1125), and transfers the interest packet to the third router 124 (S1127) The third router 124 updates the PIT based on the interest packet received in step S1127 (S1129), transfers the interest packet to the producer server 130 to request content (S1131).

Upon receiving the interest packet in S1131, the producer server 130 transmits a data packet to the third router 124 to transfer content corresponding to the interest packet (S1133), and the third router 124 transfers the data packet to the second router 122 (S1135) and removes the PIT (S1137).

Upon receiving the data packet in S1135, the second router 122 transfers the data packet to the first router 120 (S1139) and removes the PIT based on the data packet (S1141). Upon receiving the data packet in S1139, the first router 120 transfers the received data packet to the fourth router 126 (S1143) and removes the PIT based on the data packet (S1145).

Upon receiving the data packet in S1143, the fourth router 126 transfers the received data packet to the user equipment 110 to provide the content requested by the user equipment (S1147), and removes the PIT based on the data packet (S1149).

In this way, in the pointer forwarding-based routing scheme, the interest packet is transferred from the user equipment 110 to the producer server 130 through the first router 120 which is a home router via a routing path pathing through connected routers (user equipment→fourth router→first router→second router→third router→producer server), and the data packet is transferred through the reverse path of the interest packet transfer path (producer server→third router→second router→first router→fourth router→user equipment).

The method for providing a routing path between a user equipment and a producer server according to the present invention can be implemented in the form of program instructions that can be executed through various computer components and recorded on a computer-readable recording medium. The computer-readable recording medium may include program instructions, data files, data structures, etc. alone or in combination.

Program instructions recorded on the computer-readable recording medium may be specially designed and configured for the present invention, or may be known and usable to those skilled in the art of computer software.

Examples of computer-readable recording media comprise magnetic media such as hard disks, floppy disks, and magnetic tapes, optical recording media such as CD-ROMs and DVDs, magneto-optical media such as floptical disks, and hardware devices specially configured to store and execute program instructions, such as ROM, RAM, flash memory, and the like.

Examples of program instructions comprise high-level language codes that can be executed by a computer using an interpreter or the like as well as machine language codes generated by a compiler. The hardware device may be configured to act as one or more software modules to perform processing according to the present invention and vice versa.

Although various embodiments of the present invention have been shown and described above, the present invention is not limited to the specific embodiments described above. The present invention can be modified and practiced by those skilled in the technical field to which the present invention pertains without departing from the gist of the present invention claimed in the claims, and these modifications should not be individually understood from the technical spirit or perspective of the present invention.

REFERENCE NUMERAL

100: ICN system
110: user equipment
120: first ICN router
122: second ICN router
124: third INC router
130: producer server
131: transmission unit
132: reception unit
133: control unit
133-1: measurement unit
133-2: estimation unit
133-3: selection unit
133-4: update unit

The invention claimed is:

1. A method for providing a routing path of a producer server in an information-centric networking system comprising:

measuring a first routing cost for each of a plurality of routing schemes based on a transition cost between routing schemes, an update packet transfer cost, an interest packet transfer cost, and a data packet transfer cost at $T_{k-1}$, wherein k is a positive integer greater than 2;

estimating a second routing cost of period $T_k$ for each of the routing schemes based on a third routing cost estimated at period $T_{k-1}$ and the measured first routing cost;

selecting a routing scheme so that the estimated second routing cost is minimum; and providing a routing path between the producer server and the user equipment by applying the selected routing scheme.

2. The method of claim 1 further comprises, measuring an update packet transfer cost for each of the routing schemes when the producer server moves to a new access router; and generating and transferring an update packet corresponding to the selected routing scheme to the new access router.

3. The method of claim 1 further comprises, measuring an interest packet transfer cost and a data packet transfer cost for each of the routing schemes when an interest packet requesting content is received from the user equipment; and generating and transferring a data packet providing the requested content to the user equipment.

4. The method of claim 1 further comprises, updating an anchor router and a home router constituting the ICN system to a new access router when a transition between the routing schemes occurs.

5. The method of claim 2, wherein the update packet transfer cost is, defined as a sum of costs of transferring the update packet to all routers in the ICN system in a case of a flooding-based routing scheme, defined as a sum of costs of transferring the update packet from the new access router to a previous access router through an anchor router in a case of an anchor-based routing scheme, or defined as a sum of costs of transferring the update packet from the new access router to a previous access router through a home router in case of a point forwarding-based routing scheme.

6. The method of claim 3, wherein the interest packet transfer cost is, defined as a sum of costs of transferring the interest packet from the user equipment to the producer server through an access router of the user equipment and a new access router of the producer server in a case of a flooding-based routing scheme, defined as a sum of costs of transferring the interest packet from the user equipment to the producer server through an access router of the user equipment, an anchor router, and a new access router of the producer server in a case of an anchor-based routing scheme, or defined as a sum of costs of transferring the interest packet from the user equipment to the producer server through an access router of the user equipment, a home router, a previous access router of the producer server, and a new access router of the producer server in a case of a point forwarding-based routing scheme.

7. The method of claim 3, wherein the data packet transfer cost is,
 defined as a sum of costs of transferring the data packet from the producer server to the user equipment through a new access router of the producer server and an access router of the user equipment in a case of a flooding-based routing scheme,
 defined as a sum of costs of transferring the data packet from the producer server to the user equipment through a new access router of the producer server, an anchor router, and an access router of the user equipment in a case of an anchor-based routing scheme, or
 defined as a sum of costs of transferring the data packet from the producer server to the user equipment through a new access router of the producer server, a previous access router of the producer server, a home router, and an access router of the user equipment in a case of a point forwarding-based routing scheme.

8. A producer server for providing a routing path in an information-centric networking system comprising:
 one or more processors; and
 a memory for storing one or more instructions,
 wherein the one or more processors execute the stored one or more instructions to perform operations comprising:
 measuring a first routing cost for each of a plurality of routing schemes based on a transition cost between routing schemes, an update packet transfer cost, an interest packet transfer cost, and a data packet transfer cost at period $T_{k-1}$, wherein k is a positive integer greater than 2;
 estimating a second routing cost of period $T_k$ for each of the routing schemes based on a third routing cost and the measured first routing cost; and
 selecting a routing scheme so that the estimated second routing cost is minimum,
 wherein the producer server provides a routing path between the producer server and the user equipment by applying the selected routing scheme.

9. The producer server of claim 8, wherein the operations further comprise:
 measuring an update packet transfer cost for each of the routing schemes when the producer server moves to a new access router, and generating and transferring an update packet corresponding to the selected routing scheme to the new access router.

10. The producer server of claim 8, wherein the operations further comprise:
 measuring an interest packet transfer cost and a data packet transfer cost for each of the routing schemes when an interest packet requesting content is received from the user equipment, and generating and transferring a data packet providing the requested content to the user equipment.

11. The producer server of claim 8 further comprise:
 updating an anchor router and a home router constituting the ICN system to a new access router when a transition between the routing schemes occurs.

12. The producer server of claim 9, wherein the update packet transfer cost is,
 defined as a sum of costs of transferring the update packet to all routers in the ICN system in a case of a flooding-based routing scheme,
 defined as a sum of costs of transferring the update packet from the new access router to a previous access router through an anchor router in a case of an anchor-based routing scheme, or
 defined as a sum of costs of transferring the update packet from the new access router to a previous access router through a home router in case of a point forwarding-based routing scheme.

13. The producer server of claim 10, wherein the interest packet transfer cost is,
 defined as a sum of costs of transferring the interest packet from the user equipment to the producer server through an access router of the user equipment and a new access router of the producer server in a case of a flooding-based routing scheme,
 defined as a sum of costs of transferring the interest packet from the user equipment to the producer server through an access router of the user equipment, an anchor router, and a new access router of the producer server in a case of an anchor-based routing scheme, or
 defined as a sum of costs of transferring the interest packet from the user equipment to the producer server through an access router of the user equipment, a home router, a previous access router of the producer server, and a new access router of the producer server in a case of a point forwarding-based routing scheme.

14. The producer server of claim 10, wherein the data packet transfer cost is,
 defined as a sum of costs of transferring the data packet from the producer server to the user equipment through a new access router of the producer server and an access router of the user equipment in a case of a flooding-based routing scheme,
 defined as a sum of costs of transferring the data packet from the producer server to the user equipment through a new access router of the producer server, an anchor router, and an access router of the user equipment in a case of an anchor-based routing scheme, or
 defined as a sum of costs of transferring the data packet from the producer server to the user equipment through a new access router of the producer server, a previous access router of the producer server, a home router, and an access router of the user equipment in a case of a point forwarding-based routing scheme.

\* \* \* \* \*